United States Patent [19]

Raftis et al.

[11] 4,172,580
[45] Oct. 30, 1979

[54] PINCH VALVE

[75] Inventors: Spiros G. Raftis, Pittsburgh; James A. Campbell, Monroeville, both of Pa.

[73] Assignee: Red Valve Company Inc., Carnegie, Pa.

[21] Appl. No.: 830,453

[22] Filed: Sep. 6, 1977

[51] Int. Cl.$^2$ .............................................. F16K 7/06
[52] U.S. Cl. ............................................ 251/8; 251/7
[58] Field of Search .............................. 251/4, 7–10, 251/5

[56] References Cited

FOREIGN PATENT DOCUMENTS

| | | | |
|---|---|---|---|
| 1038850 | 9/1958 | Fed. Rep. of Germany | 251/9 |
| 535034 | 10/1955 | Italy | 251/8 |
| 639646 | 7/1950 | United Kingdom | 251/8 |

*Primary Examiner*—Martin P. Schwadron
*Assistant Examiner*—Richard Gerard

*Attorney, Agent, or Firm*—Kirschstein, Kirschstein, Ottinger & Cobrin

[57] ABSTRACT

An improved pinch valve construction comprises a pair of pinch bars spaced apart of each other, and a valve sleeve intermediate the pinch bars and having wall portions bounding a flow-through passage. A flow-control device moves the pinch bars towards and away from each other and is operative for urging the sleeve from an open configuration in which the wall portions are spaced apart at a pre-determined distance to thereby permit flow through the passage, towards a flattened configuration in which the wall portions are spaced at a distance less than the predetermined distance to thereby restrict flow through the passage. A restoring device urges the sleeve from the flattened configuration towards the open configuration, whereby any tendency of the sleeve to remain in the flattened configuration when the pinch bars are moved away from each other is counteracted.

4 Claims, 6 Drawing Figures

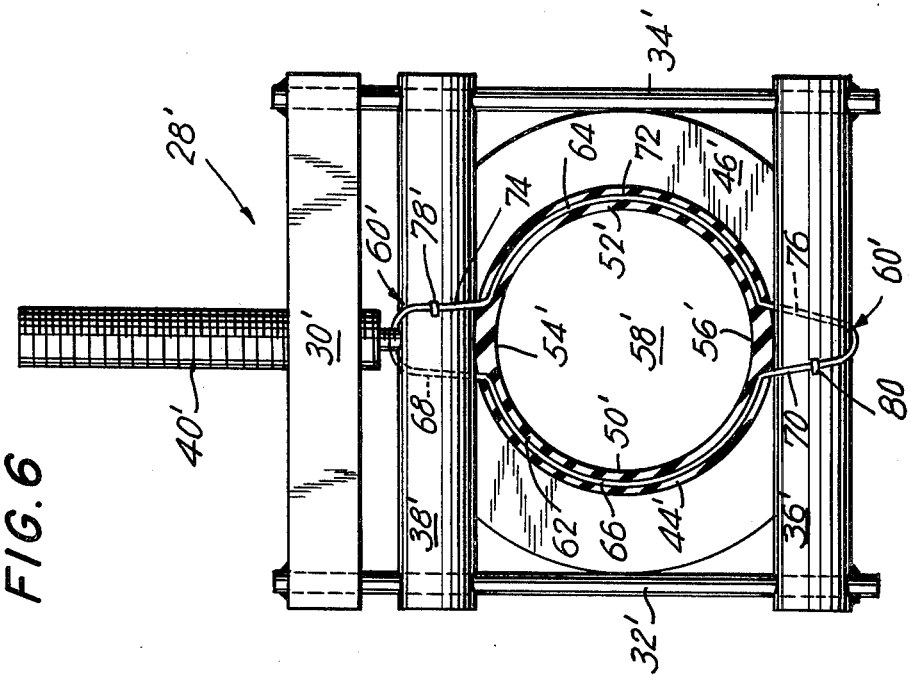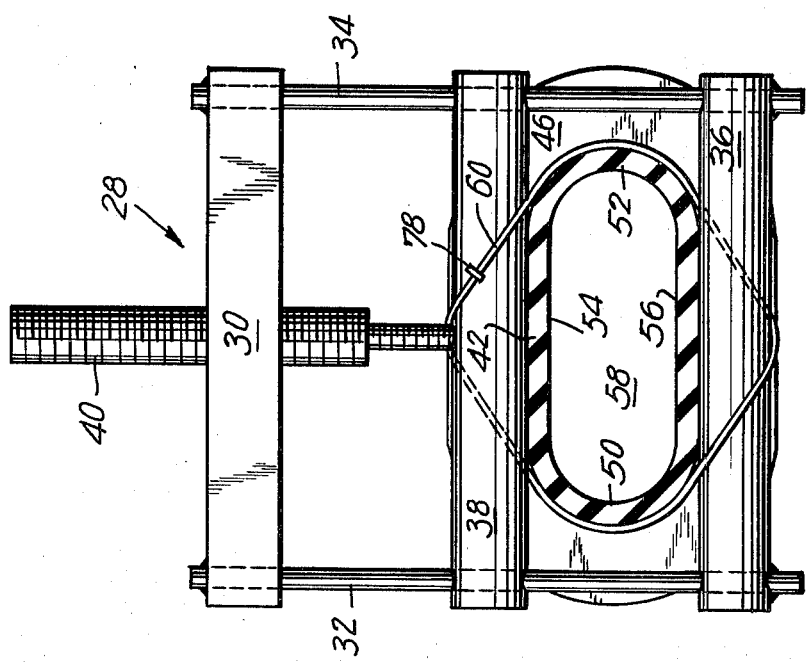

PINCH VALVE

FIELD OF THE INVENTION

The present invention generally relates to an improved pinch valve construction which can be used in any type of pipeline, including a line with substantially zero pressure or gravity flow therein.

DESCRIPTION OF THE PRIOR ART

Typically, a pinch valve arrangement includes a valve sleeve. The valve sleeve includes a tubular elastomeric section, generally cylindrical in construction, and opposed flanges at opposite ends of the tubular section. The flanges are fastened to adjacent sections of a pipeline.

A mechanical actuator causes a movable pinch bar or other pinching element to compress the tubular sleeve section by flattening it against a fixed pinching element, thereby adjustably controlling the flow of material through the sleeve.

Normally, a pinch valve sleeve is made from pure gum rubber, neoprene, BUNA, butyl, hypalon, urethane, viton, EPT (nordel), silicone, or food grade rubber.

Pinch valve constructions as generally described herein have been used in controlling the flow of, by way of example, solids in suspension (either in slurry or air-conveying form), abrasive materials such as metallic ores, asbestos fibers, sand, coal, sugar, wood chips, pulp, paper stock, plastic pellets, raw sewage, talc, cement, fly ash, various chemicals and foodstuffs.

While the aforementioned pinch valve construction is extremely useful in various situations, it is not entirely satisfactory when the sleeve section has been compressed or flattened for any length of time. In that event, the sleeve section tends to become set in the flattened position and remains closed even when the movable pinching element is moved away from the fixed pinching element due to the tendency of the elastomeric material to creep and solidify when kept under external compressure forces over time. The known pinch valves are particularly unsatisfactory when used in pipelines having no gravity flow or in which the materials to be conveyed are at substantially zero pressures. In such low pressure pipelines the sleeves have a marked tendency to become set in the flattened configuration.

Once a sleeve has become set, the desired flow through the entire pipeline is no longer capable of being controlled. It is frequently necessary to replace the entire pinch valve, thereby resulting in high maintenance costs and a relatively short working life time for the pinch valve.

SUMMARY OF THE INVENTION

1. Purposes of the Invention

It is an object of the present invention to provide an improved pinch valve construction which overcomes the aforementioned drawbacks of the prior art.

Another object of the present invention is to provide an improved pinch valve construction wherein the pinch valve sleeve is forced back into its original configuration as the movable pinching element is withdrawn.

A further object of the present invention is to provide an improved pinch valve construction which is particularly suitable for use in a pipeline with little or no pressure or gravity flow therein.

2. Brief Description of the Invention

According to the present invention, the foregoing as well as other objects, are accomplished by an improved pinch valve construction which includes an elastomeric pinch valve sleeve having an elongated central flow-through passage. The pinch valve construction includes a movable pinching element and a fixed pinching element, both elements being juxtaposed opposite wall portions of the pinch valve sleeve. In a preferred embodiment, an endless loop extends circumferentially around the peripheries of the fixed pinching element, the valve sleeve, and the movable pinching element. The loop is of such circumferential length that there is substantially no slack in it when the valve sleeve has been flattened upon movement of the movable element towards the fixed element.

In normal use, the pinch valve sleeve is closed by means of the movable pinching element urging the sleeve in one direction against the fixed pinching element, thereby flattening the sleeve and restricting the material flow through the passage. As the movable pinching element is moved in the opposite direction, the endless loop exerts pressure on additional wall portions of the flattened sleeve, thereby restoring the sleeve to its original configuration and permitting increased material flow through the passage of the sleeve.

Alternatively, portions of two cables are embedded in opposed wall portions of the pinch valve sleeve with the first projecting ends of the two cables extending circumferentially around the periphery of the movable pinching element and attached to each other and with the second projecting ends of the cables extending circumferentially around the periphery of the fixed pinching element and attached to each other.

The invention accordingly resides in, inter alia, the features of construction, combination of elements, and arrangement of parts which will be exemplified in the device hereinafter described and of which the scope of application will be indicated in the appended claims. However, the invention, both as to its construction and its method of operation, together with additional objects and advantages thereof, will be best understood from the descriptions of the accompanying drawings and the specific embodiments.

BRIEF DESCRIPTION OF THE DRAWINGS

In the drawings wherein like parts are given the same reference numerals:

FIG. 5 is an elevation view analogous to FIG. 2 according to the first embodiment showing the valve sleeve in section and in partially open, i.e. somewhat flattened, configuration; and FIG. 6 is an elevation view of a second embodiment of a pinch valve construction according to the present invention showing the valve sleeve in section and in a fully open configuration.

DETAILED DESCRIPTION OF THE PREFERRED EMBODIMENTS

Figure 1:
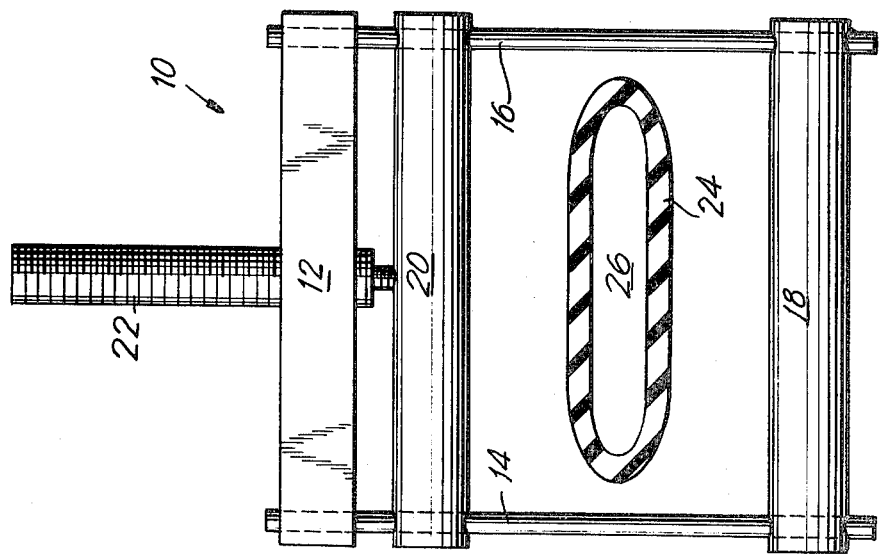
FIG. 1 is an elevation view of a pinch valve construction according to the prior art showing a valve sleeve in section remaining set in a somewhat flattened configuration although the movable pinch bar has been withdrawn.

In the drawings, FIG. 1 shows a pinch valve construction 10, according to the prior art, having a valve housing member 12. Guide rods 14 and 16 are attached to the valve housing member 12 and to a fixed valve member 18. Both valve member 18 and housing member 20 extend between the spaced guide rods 14,16 in parallel relationship to each other. A movable valve member 20 is attached to flow control means including a drive shaft 22, which passes through a passage formed in the valve housing member 12. The movable valve member 20 is mounted on the guide rods 14 and 16 for sliding movement lengthwise of the latter between the valve housing member 12 at one end region of the guide rods and the fixed valve member 18 at the other end region of the guide rods. An elastomeric pinch valve sleeve 24 having a central flow-through passage 26 is located between the movable valve member 20 and the fixed valve member 18. The valve sleeve 24 is attached by conventional means to adjacent non-illustrated sections in a pipeline.

In operation of the prior art device, in order to restrict the flow of material through the passage 26, the movable valve member 20 is urged by flow control means 22 towards the fixed valve member 18, thus compressing the sleeve 24 and forcing it to assume a generally flattened configuration; i.e., the cross-sectional area of the flow-through passage 26 has been decreased. In another phase of operation of the prior art device, movable member 20 is moved by flow control means 22 away from the fixed valve member 18, thus relieving pressure on the compressed sleeve 24 and permitting the valve sleeve 24 to resume its original configuration; i.e., the cross-sectional area of the flow-through passage 26 has been increased to permit less restricted flow of material therethrough.

However, the elastomeric material of which the prior art valve sleeve is composed, for example, gum rubber, neoprene, or food grade rubber, tends to creep and flow and then to solidify and harden when compressed for any substantial length of time. In other words, the valve sleeve 24 takes a compression set whose effect is magnified when flow control means 22 has not moved the movable valve member 20 away from the fixed valve member 18 for a long period of time.

As shown in FIG. 1, when the prior art valve sleeve 24 has taken a compression set it will not resume its original configuration even after the movable valve member 20 has been moved away from the fixed valve member 18, and thus the flow of material through the passage 26 remains restricted. This problem is especially acute when the valve is used in a pipeline with substantially zero line pressure or gravity flow as there is insufficient internal pressure on the inner circumferential valve sleeve wall portions in such a line to urge the sleeve back into its original configuration.

In FIGS. 2-5, an improved pinch valve construction 28 according to a first embodiment of the present invention is shown, and includes a valve housing member 30. Guide rods 32 and 34 are attached to the valve housing member 30 and to a fixed member 36 which extends in mutually parallel relationship relative to housing member 30. A movable valve member 38 is attached to flow control means or drive shaft 40 which passes through a passage provided in the valve housing member 30. The movable valve member 38 is mounted for sliding movement on the guide rods 32 and 34 lengthwise of the latter between the valve housing member 30 at one end region of the guide rods and the valve member 36 at the other end region of the guide rods.

Figure 2:
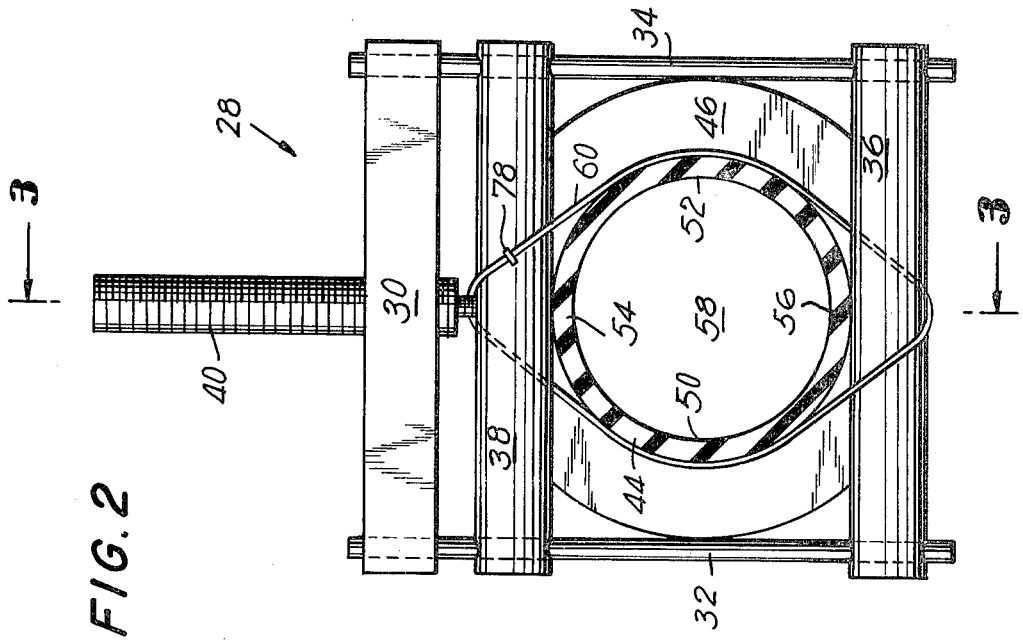
FIG. 2 is an elevation view of a pinch valve construction according to a first embodiment of the present invention showing the valve sleeve in section and in a fully open configuration.
Figure 3:
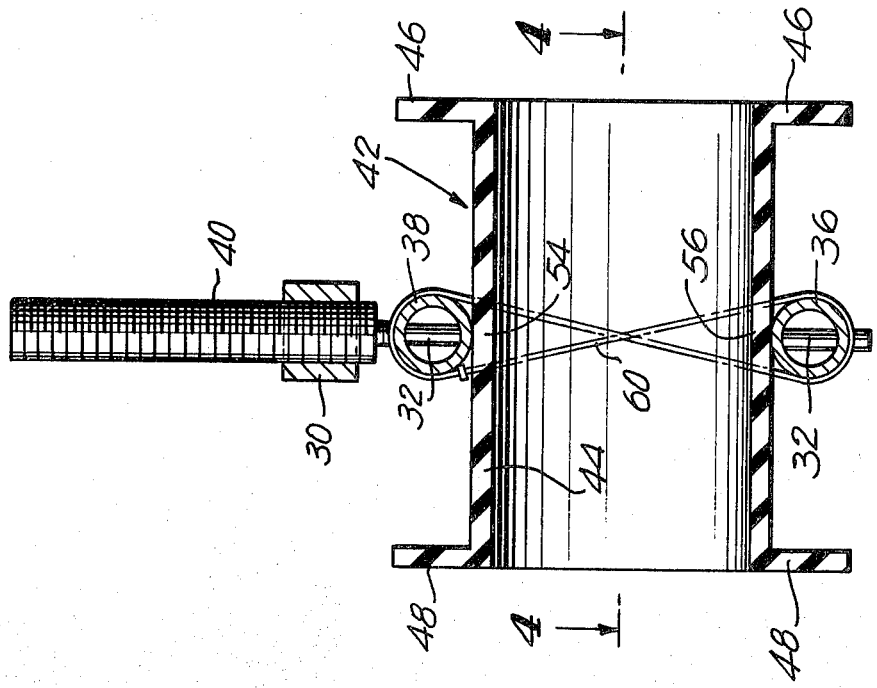
FIG. 3 is a sectional view taken substantially along line 3—3 of the embodiment of FIG. 2.

A pinch valve sleeve 42, best seen in FIG. 3, having an elastomeric tubular section or main body portion preferably but not necessarily of one piece with a pair of end flanges 46 and 48 is located between the movable valve member or pinch bar 38 and the fixed valve member or stationary pinch bar 36 as shown in FIG. 2. The elastomeric tubular section 44 comprises a pair of lateral wall portions 50 and 52, and an additional pair of opposed wall portions 54 and 56, all of the wall portions 50,52,54 and 56 together bounding a flow-through passage 58. The tubular section 44 is constituted by elastomeric materials such as pure gum rubber, neoprene, BUNA, butyl, Hypolon, urethane, viton, EPT (nordel), silicone or food grade rubber. The pinch valve sleeve 42 is attached in conventional manner to adjacent nonillustrated sections of a pipeline by means of the end flanges 46 and 48, which may be constituted by any shape-retaining material such as metal, synthetic plastic material, or resilient elastomeric material and may be attached to the adjacent nonillustrated pipe sections by bolting, welding, soldering, or any other analogous fastening technique.

Figure 4:
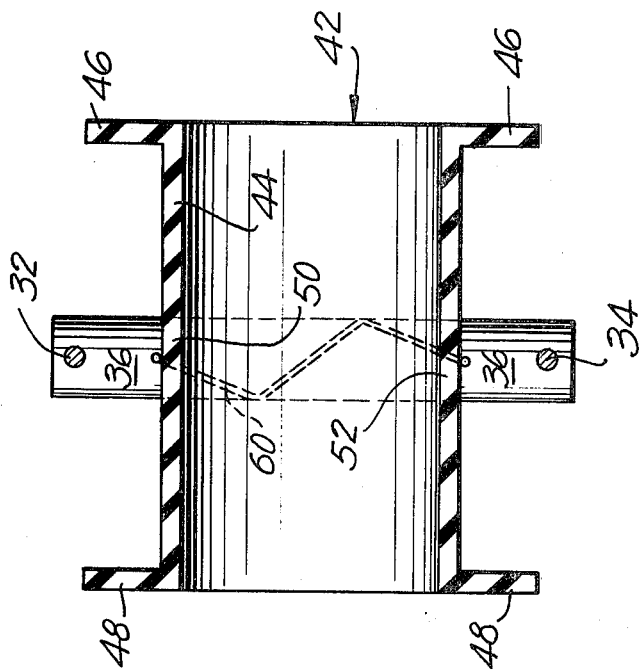
FIG. 4 is a sectional plan view taken substantially along the line 4—4 of the embodiment of FIG. 3.

In accordance with the invention, a restoring means 60 comprising an elongated restoring element whose ends are connected by a suitable fastening means 78 to form an endless resilient loop, for example a band or filament of spring steel, extends circumferentially around the peripheries of the movable valve member 38, the tubular valve sleeve section 44, and the fixed valve member 36, as shown in FIGS. 2-4. Portions of the loop 60 engage the lateral wall portions 50 and 52 of the tubular sleeve section 44. The endless loop 60 is of such circumferential length that there is substantially no slack in it when movable valve member 38 is moved towards fixed valve member 36 to a position nearly adjacent to the latter.

In operation, in order to restrict the flow of material through the passage 58, the movable valve member 38 is urged by flow control means 40 towards the fixed valve member 36, thus compressing the sleeve 42 as shown in FIG. 5 and forcing the opposed wall portions 54 and 56 of tubular valve sleeve section 44 to approach each other, as well as decreasing the effective cross-sectional area of the flow-through passage 58 and restricting the flow of material therethrough.

In order to open the valve passage 58, the movable valve member 38 is moved by flow control means 40 away from the fixed valve member 36 as shown in FIG. 2, causing the endless loop 60 to exert pressure on the lateral wall portions 50 and 52 directed inwardly towards the center of the tubular sleeve section 44. The inward pressure exerted by the loop 60 on the lateral wall portions 50 and 52 increases as the pressure exerted on the opposed wall portions 54 and 56 by the valve members 36 and 38 is decreased by the withdrawal of the movable valve member 36, thus overcoming the tendency of the elastomeric tubular valve sleeve section 44 to remain set in a flattened configuration. The tubular sleeve section 44 is forcibly restored to its original open configuration by the action of the endless loop 60, thereby permitting resumption of unrestricted flow of material through the valve passage 58.

Another preferred embodiment of the present invention is shown in FIG. 6 which is analogous to FIG. 2, and in which parts which correspond to parts in FIG. 2 are given corresponding primed numerals. In this second preferred embodiment, the restoring means 60' comprises two restoring elements or cables 62 and 64 composed of a resilient material such as spring steel. An insert portion 66 of the cable 62 is embedded in the lateral wall portion 50' of tubular valve sleeve section 44' with two offset end portions 68 and 70 of the cable 62 projecting outwardly beyond the tubular sleeve section 44'. An insert portion 72 of the cable 64 is similarly embedded in the lateral wall portion 52' of the tubular sleeve section 44' with two offset end portions 74 and 76 projecting outwardly beyond the tubular sleeve section 44'. The projecting end portion 68 of the cable 62 and the projecting end portion 74 of the cable 64 extend around the periphery of the movable valve member 38' and are fastened to each other by a suitable fastening means 78', for example a clamp or weld joint. In a like manner, the projecting end portion 70 of the cable 62 and the projecting end portion 76 of the cable 64 extend around the periphery of the fixed valve member 36' and are fastened to each other by an analogous fastening means 80.

As will be apparent to those skilled in the art, the pinch valve construction just described is particularly suitable for adjustably controlling the flow of material through a pipeline, even in a line with substantially zero pressure or gravity flow, because the tendency of the elastomeric valve sleeve to take a compression set when kept in a flattened position over time is overcome by the action of the restoring means hereinabove described. The unrestricted flow of material through the valve sleeve may be resumed at the desired time merely by moving the movable valve member away from the fixed valve member.

It will be understood that each of the elements described above, or two or more together, may also find a useful application in other types of constructions differing from the types described above.

For example, the restoring means 60 or 60' need not be a single loop, but may instead comprise several turns of a winding. Restoring means 60 or 60' need not be constituted by spring steel, but any resilient or slightly resilient metal or synthetic plastic material may be employed. With particular reference to restoring means 60', the cables 62 and 64 need not have any portions thereof embedded in the tubular section 44', but they may instead be adhesively or otherwise secured to the tubular section 44'.

While the invention has been illustrated and described as embodied in a pinch valve it is not intended to be limited to the details shown, since various modifications and structural changes may be made without departing in any way from the spirit for the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

Having thus described the invention, there is claimed as new and desired to be secured by Letters Patent:

1. A pinch valve comprising:
   (a) a pair of valve members spaced apart of each other;
   (b) a valve sleeve located between said valve members and having opposed wall portions bounding a flow-through passage;
   (c) flow-control means for moving said valve members towards and away from each other and operative for urging said sleeve from an open configuration in which said opposed wall portions are spaced apart at a predetermined distance to thereby permit flow through said passage, towards a flattened configuration in which said opposed wall portions are spaced at a distance less than said predetermined distance to thereby restrict flow through said passage; and
   (d) restoring means for urging said sleeve from said flattened configuration, whereby any tendency of said sleeve to remain in said flattened configuration when said valve members are moved away from each other is counteracted, said restoring means comprising a pair of interconnected filaments extending generally in a direction about the peripheries of said valve members and said valve sleeve, each filament having an insert portion embedded in said valve sleeve and an offset portion projecting away from said valve sleeve; together with means for fastening the offset portion of one of said filaments with the offset portion of the other of said filaments.

2. A pinch valve according to claim 1 wherein said valve members comprise a stationary pinching element and a movable pinching element, and wherein said flow control means is operative for moving said movable pinching element towards and away from said stationary pinching element.

3. A pinch valve according to claim 1 wherein said valve sleeve comprises an elastomeric tubular section of one piece with a pair of flanges, provided at opposite ends of said tubular section.

4. A pinch valve according to claim 1 wherein said flow control means includes a drive shaft connected to one of said valve members.

* * * * *